(12) United States Patent
Yoshikawa et al.

(10) Patent No.: US 10,248,458 B2
(45) Date of Patent: Apr. 2, 2019

(54) CONTROL METHOD, NON-TRANSITORY COMPUTER-READABLE STORAGE MEDIUM, AND CONTROL DEVICE

(71) Applicant: FUJITSU LIMITED, Kawasaki-shi, Kanagawa (JP)

(72) Inventors: Daiki Yoshikawa, Handa (JP); Masahiro Fukuda, Nagoya (JP); Shotaro Okada, Nishinomiya (JP); Kiyoshi Kouge, Kuwana (JP); Takashi Ikezaki, Yatomi (JP); Masashi Katou, Nagoya (JP); Eiichi Higuchi, Toyota (JP); Jun Ikeshima, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 15/464,878

(22) Filed: Mar. 21, 2017

(65) Prior Publication Data

US 2017/0277563 A1  Sep. 28, 2017

(30) Foreign Application Priority Data

Mar. 24, 2016  (JP) .................... 2016-060915

(51) Int. Cl.
*G06F 9/46* (2006.01)
*G06F 9/48* (2006.01)
*G06F 9/50* (2006.01)

(52) U.S. Cl.
CPC .......... *G06F 9/4887* (2013.01); *G06F 9/5038* (2013.01)

(58) Field of Classification Search
CPC ............. G06F 11/3419; G06F 11/3409; G06F 11/3452; G06F 17/30442; G06F 2201/80; G06F 11/3466; G06F 17/30477; G06F 2209/501; G06F 3/0653

See application file for complete search history.

(56) References Cited

U.S. PATENT DOCUMENTS

| | | | |
|---|---|---|---|
| 6,546,402 B1 * | 4/2003 | Beyer | G06F 17/30383 707/625 |
| 7,054,893 B2 * | 5/2006 | Mogi | G06F 17/30312 |
| 7,716,425 B1 * | 5/2010 | Uysal | G06F 12/0862 711/137 |

(Continued)

FOREIGN PATENT DOCUMENTS

| | | |
|---|---|---|
| JM | 2007-249491 A | 9/2007 |
| JP | 10-11406 A | 1/1998 |
| JP | 2007-249491 A | 9/2007 |

*Primary Examiner* — Dong U Kim
(74) *Attorney, Agent, or Firm* — Westerman, Hattori, Daniels & Adrian, LLP

(57) ABSTRACT

A control method executed by a control device, the control method including identifying a specified time period based on execution history information on previous jobs related to the plurality of systems, the specified time period being a period prior to execution start timing of a first job, update processing for a data storage area from which the first job refers to data is not executed during the specified time period, performing control so that evaluation timing of an amount of the data that the first job refers to from the data storage area is included in the identified time period, determining a specified system among from the plurality of systems based on the amount of the data evaluated at the evaluation timing, and causing the specified system to execute the first job.

10 Claims, 15 Drawing Sheets

(56) References Cited

U.S. PATENT DOCUMENTS

| | | | | |
|---|---|---|---|---|
| 8,131,713 B2* | 3/2012 | Weissman | ......... | G06F 17/30442 |
| | | | | 707/718 |
| 9,262,477 B1* | 2/2016 | Gu | ................... | G06F 17/30463 |
| 9,412,066 B1* | 8/2016 | Satish | ...................... | G06N 5/02 |
| 2003/0135353 A1* | 7/2003 | Houyoux | ............... | G06Q 30/04 |
| | | | | 703/2 |
| 2004/0030827 A1* | 2/2004 | Hall | ..................... | G06F 3/0611 |
| | | | | 711/113 |
| 2004/0193827 A1* | 9/2004 | Mogi | ................... | G06F 9/5083 |
| | | | | 711/170 |
| 2006/0136499 A1* | 6/2006 | Aboulnaga | ....... | G06F 17/30339 |
| 2007/0150961 A1* | 6/2007 | Ikeda | ..................... | H04L 63/08 |
| | | | | 726/27 |
| 2007/0162584 A1* | 7/2007 | Kokusho | .............. | G06F 9/5061 |
| | | | | 709/223 |
| 2007/0220516 A1 | 9/2007 | Ishiguro et al. | | |
| 2007/0299814 A1* | 12/2007 | Barsness | ........... | G06F 17/30442 |
| 2008/0133973 A1* | 6/2008 | Mizoe | ................... | G06Q 10/06 |
| | | | | 714/37 |
| 2011/0313999 A1* | 12/2011 | Bruno | .............. | G06F 17/30454 |
| | | | | 707/718 |
| 2012/0101802 A1* | 4/2012 | Nonoyama | ......... | G06F 11/3476 |
| | | | | 703/22 |
| 2012/0151138 A1* | 6/2012 | Tokuda | .................. | G06F 3/061 |
| | | | | 711/114 |
| 2014/0032528 A1* | 1/2014 | Mandre | ............. | G06F 17/30463 |
| | | | | 707/718 |
| 2014/0229464 A1* | 8/2014 | Milenova | .......... | G06F 17/30477 |
| | | | | 707/718 |
| 2015/0033233 A1* | 1/2015 | Hosokawa | ........... | G06F 9/4887 |
| | | | | 718/102 |
| 2016/0162369 A1* | 6/2016 | Ahn | .................... | G06F 11/1451 |
| | | | | 707/654 |
| 2017/0139382 A1* | 5/2017 | Sayyarrodsari | ...... | G05B 23/024 |

* cited by examiner

FIG. 3
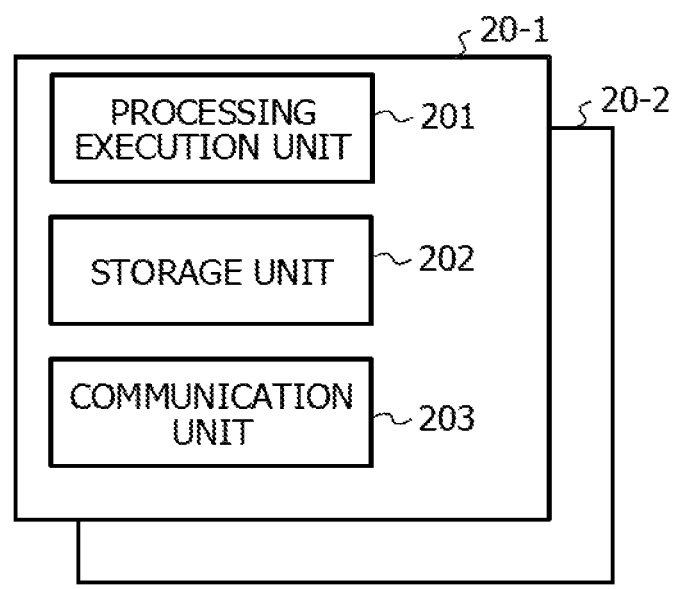
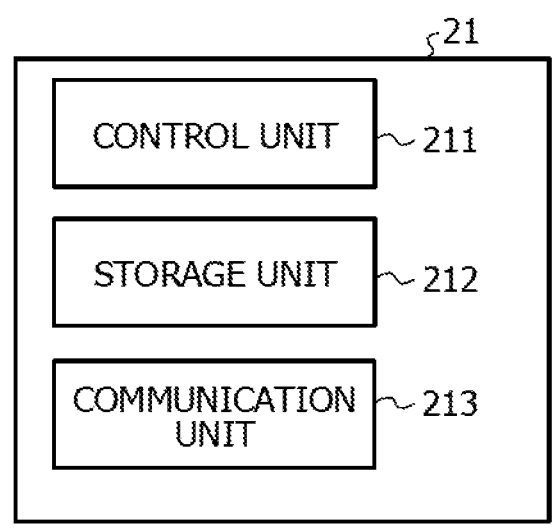

FIG. 5

| JOB NAME | START TIME | JOB INFORMATION | EXECUTION SERVER INFORMATION | TARGET FLAG |
|---|---|---|---|---|
| Job-AA | 17:30:00 | C:¥a.exe | host A1 | OFF |
| Job-BB | 19:00:00 | C:¥b.exe | host B2 | OFF |
| Job-CC | 21:00:00 | C:¥c.exe | host C1 | OFF |
| Job-DD | 22:30:00 | C:¥d.exe | host C2 | OFF |
| Job-EE | 0:00:00 | C:¥e.exe | host B1 | ON |

(columns: 6211, 6212, 6213, 6214, 6215)

FIG. 6

| JOB NAME ⌐6221 | START TIME ⌐6222 | DATA TABLE ID ⌐6223 | ACCESS TYPE ⌐6224 | UPDATE FLAG ⌐6225 |
|---|---|---|---|---|
| Job-AA | 17:30:00 | A-1 | INPUT | OFF |
| | | A-2 | OUTPUT | ON |
| Job-BB | 19:00:00 | A-3 | INPUT | OFF |
| | | B-2 | OUTPUT | ON |
| Job-CC | 21:00:00 | B-1 | INPUT | OFF |
| | | A-4 | INPUT | OFF |
| | | C-1 | OUTPUT | ON |
| Job-DD | 22:30:00 | B-3 | INPUT | OFF |
| | | C-2 | INPUT | OFF |
| | | A-2 | OUTPUT | OFF |
| Job-EE | 0:00:00 | A-2 | INPUT | OFF |
| | | B-2 | INPUT | OFF |
| | | C-3 | OUTPUT | ON |

FIG. 7

| JOB NAME | INPUT DATA TABLE ID | DATA SIZE [KB] (PER RECORD) | NUMBER OF RECORDS | INPUT DATA AMOUNT [MB] |
|---|---|---|---|---|
| Job-AA | A-1 | 40 | 1000 | 40 |
| Job-BB | A-3 | 30 | 6000 | 180 |
| Job-CC | B-1 | 10 | 5000 | 50 |
|  | C-2 | 50 | 5000 | 250 |
| Job-DD | B-3 | 40 | 3000 | 120 |
|  | C-2 | 50 | 5000 | 250 |
| Job-EE | A-2 | 80 | 1000 | 80 |
|  | B-2 | 70 | 6000 | 420 |

FIG. 9

SELECT ... FROM table_A-2
 WHERE column_1 = XXX   } — 901

SELECT ... FROM table_B-2
 WHERE column_2 >= YYY   } — 902

FIG. 10

| JOB NAME ⌠6241 | START TIME ⌠6242 | END TIME ⌠6243 | STATUS INFORMATION ⌠6244 |
|---|---|---|---|
| Job-AA | 17:30:00 | 18:12:34 | NORMAL COMPLETION |
| Job-BB | 19:02:05 | 20:11:56 | NORMAL COMPLETION |
| Job-CC | 21:01:43 | 22:25:11 | NORMAL COMPLETION |
| Job-DD | 22:40:06 | 23:40:27 | NORMAL COMPLETION |
| Job-EE | 0:00:00 | 0:06:54 | NORMAL COMPLETION |

FIG. 12

| | 6251 | 6252 | 6253 | 6254 | 6255 |
|---|---|---|---|---|---|
| | JOB NAME | DATA TABLE ID | ACCESS TYPE | DATA AMOUNT VARIATION FLAG | MAGNITUDE RELATION INFORMATION |
| | Job-AA | A-1 | INPUT | ON | INPUT |
| | | A-2 | OUTPUT | - | |
| | Job-BB | A-3 | INPUT | ON | OUTPUT |
| | | B-2 | OUTPUT | - | |
| | Job-CC | B-1 | INPUT | ON | OUTPUT |
| | | A-4 | INPUT | OFF | |
| | | C-1 | OUTPUT | - | |
| | Job-DD | B-3 | INPUT | OFF | INPUT |
| | | C-2 | INPUT | OFF | |
| | | A-2 | OUTPUT | - | |
| | Job-EE | A-2 | INPUT | ON | INPUT |
| | | B-2 | INPUT | ON | |
| | | C-3 | OUTPUT | - | |

CONTROL METHOD, NON-TRANSITORY COMPUTER-READABLE STORAGE MEDIUM, AND CONTROL DEVICE

CROSS-REFERENCE TO RELATED APPLICATION

This application is based upon and claims the benefit of priority of the prior Japanese Patent Application No. 2016-060915, filed on Mar. 24, 2016, the entire contents of which are incorporated herein by reference.

FIELD

The embodiments discussed herein are related to a control method, a non-transitory computer-readable storage medium, and a control device.

BACKGROUND

When a system operator operates a plurality of information processing systems, an information processing device executes processing for data stored in a database (DB) due to an operation of the information processing system and stores the processing result in the database or the like. For example, a DB is provided for each of the plurality of information processing systems such as an operation system, a nucleus system, and the like. In a manufacturing industry, for example, a plurality of nucleus systems such as an inventory management system, a shipping management system, and a production management system operates, and a DB is provided for each of the systems.

At set timing (date and time), the information processing device reads pieces of data from the DB together (data input), and executes pieces of processing using the pieces of read data together and stores pieces of data that have been generated as a result of the execution, in the DB or another storage unit together (data output). At that time, pieces of data may be read from a plurality of DBs as the data input. Hereinafter, the above-described processing of the information processing device, which includes the data input/output and the execution of processing for the data, which are executed together at set timing is referred to as "job". Such a job may also be referred to as batch processing for a DB.

A job may be completed in a single information processing system, or may be completed by a plurality of information processing systems in cooperation (across the plurality of information processing systems). For example, when pieces of data are read from the DB provided in the inventory control system and the DB provided in the shipping management system and the pieces of data are processed, and the processing result is stored in the DB provided in the production management system, a job is executed between the plurality of information processing systems in cooperation.

Japanese Laid-open Patent Publication No. 10-11406 is the related art.

SUMMARY

According to an aspect of the invention, a control method executed by a control device, the control method including identifying a specified time period based on execution history information on previous jobs related to the plurality of systems, the specified time period being a period prior to execution start timing of a first job, update processing for a data storage area from which the first job refers to data is not executed during the specified time period, performing control so that evaluation timing of an amount of the data that the first job refers to from the data storage area is included in the identified time period, determining a specified system among from the plurality of systems based on the amount of the data evaluated at the evaluation timing, and causing the specified system to execute the first job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a functional block diagram illustrating a cloud environment;

FIG. 5 is a diagram illustrating an example of data stored in a job definition information storage unit;

FIG. 6 is a diagram illustrating an example of information stored in a table update information storage unit;

FIG. 7 is a diagram illustrating an example of data stored in an input data management information storage unit;

FIG. 9 is a diagram illustrating an example of an inquiry statement;

FIG. 10 is a diagram illustrating an example of information stored in an operation history information storage unit;

FIG. 12 is a diagram illustrating an example of data stored in a collection information storage unit;

DESCRIPTION OF EMBODIMENTS

Figure 1:
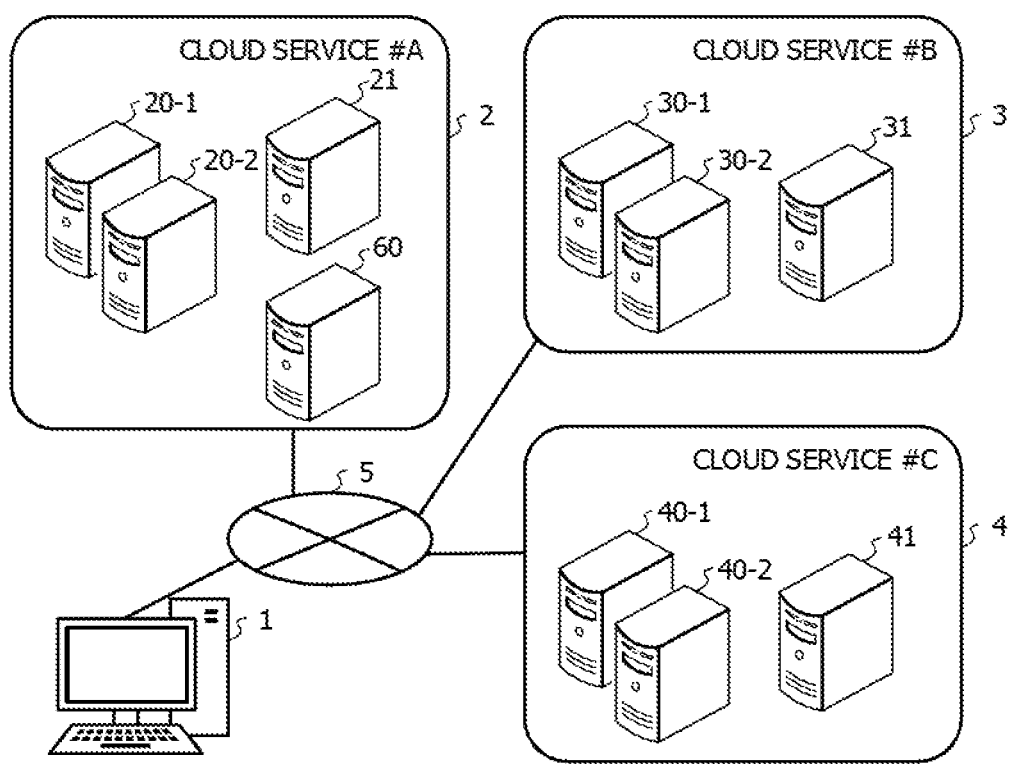
FIG. 1 is a diagram illustrating an example of a system configuration according to an embodiment.

An information processing device (hardware resource) used for an operation of an information processing system and processing of data is obtained by equipment owned by a system user (on-premises), as an example. In addition, as an example, the system user may use provided service (also referred to as a cloud service or the like) of an information processing device (information processing resource) by a data center operator.

In the usage of the cloud service, it is conceived that different cloud services are respectively utilized for a plurality of information processing systems. In an example in which the different cloud services are respectively used for the plurality of information processing systems, in many cases, a transfer time of data when a job that is to be completed between the plurality of information processing systems in cooperation is performed increases as compared with a case in which all of the plurality of information processing systems operate in an on-premises environment or a single cloud service. For example, it is assumed that a job is executed by an information processing device provided in one of the cloud services, and data reading, that is, data transfer from a plurality of DBs is performed as data input at the time of the execution of the job. When the plurality of the DBs are respectively provided in different cloud services, data transfer from a DB of the cloud service different from that of the information processing device that executes the job corresponds to data transfer between the cloud services. The speed of the data transfer between the cloud services is reduced as compared with the speed in a network of the single cloud service or the on-premises environment.

Therefore, when the whole time taken for the execution of the job is divided into a time taken for processing of data and a time taken for input/output of the data, a proportion of the time taken for the input/output of the data for the whole time becomes large. That is, even when the time taken for the processing of the data is short, an increase in the time taken for execution of the job and execution delay of the job may be caused because the time taken for the input/output of the data increases.

As a measure against the above-described problem, it is conceived that an information processing device that executes a job, that is, a cloud service used for the execution of the job is selected depending on a situation. More specifically, for example, when the job is executed by an information processing device of a cloud service in which input/output of data at the time of the execution of the job becomes maximum, it is conceived that an input/output time of the data is reduced. In order to determine an information processing device that executes the job, it is desirable that a data amount of the input/output data at the time of the execution of the job is checked (evaluated) before the execution of the job.

However, for example, data referred to at the time of the execution of the job may be updated due to execution of preceding another job in the operation of each of the information processing systems. Due to the update of the data, it is probable that a divergence occurs in the status of the data (data amount) between the time at which the data amount was evaluated in advance and the time at which the job is executed. Therefore, it is probable that execution of the job in an information processing device that has been determined based on the evaluation result does not become an optimal solution at the time of the execution of the job.

In addition, when a frequency of evaluation of the data amount is set high in order to suppress the above-described divergence of the data amounts, the processing load occurs even for the evaluation of the data amount, so that a lot of processing load is taken in addition to the processing load for the execution of the job, which is the original purpose.

An object of an embodiment is to optimize evaluation timing of a data amount in order to reduce an execution time of a job.

Embodiments of the technology discussed herein are described with reference to drawings.

<General Arrangement>

FIG. 1 is a diagram illustrating an example of a system configuration according to the embodiment. A client device 1 is allowed to be coupled to cloud environments 2, 3, and 4 through a network 5. The client device 1 is, for example, a computer such as a personal computer (PC), a smartphone, or a personal digital assistant (PDA). The user or the operator of the system may access a processing execution server, a DB server, or a control device 60 described later using the client device 1, and controls execution of a job.

Each of the cloud environments 2, 3, and 4 includes a plurality of information processing devices, and a cloud service is provided using the information processing devices provided in each of the cloud environments 2, 3, and 4. In the embodiment, in the cloud environment 2, a cloud service #A is provided. In addition, in the cloud environment 3, a cloud service #B is provided. In addition, in the cloud environment 4, a cloud service #C is provided.

Each of the cloud environments 2, 3, and 4 includes an information processing devices used for an operation of the information processing system. For example, the cloud environment 2 includes processing execution servers 20-1 and 20-2 each of which executes a job and a DB server 21 used to operate a DB that stores data. In addition, the cloud environment 3 includes processing execution servers 30-1 and 30-2 and a DB server 31. In addition, the cloud environment 4 includes processing execution servers 40-1 and 40-2 and a DB server 41. Each of the processing execution servers and the DB servers is, for example, a computer such as a server device. In FIG. 1, for each of the cloud environments, the two processing execution servers and the single DB server are illustrated, but any number of processing execution servers and DB servers may be provided.

For example, the operator or the user of the information processing system may access the cloud environment 2 using the client device 1, and utilizes the cloud service #A. For example, in the cloud environment 2, the operator or the user may operate and use a desired information processing system using the processing execution servers 20-1 and 20-2 and the DB server 21. In addition, the DB server 21 may start a DB that supports a structured query language (SQL) and that the information processing system is allowed to access, and execute control of the DB. Similar to the cloud service #A, the operator or the user of the information processing system may access the cloud environments 3 and 4 using the client device 1, and operate and use desired information processing systems and DBs using the cloud services #B and #C.

In addition, in the example of FIG. 1, the cloud service #A includes the control device 60. The control device 60 is an information processing device that controls execution of jobs in the cloud services #A to #C. The control device 60 may be provided in a cloud service other than the cloud service #A, and may be provided in an on-premises environment other than the cloud services #A to #C. In any case, as long as the control device 60 is allowed to be coupled to the client device 1 and the cloud services #A to #C through the network 5, the embodiment may be achieved. In addition, in the embodiment, the example is described in which the single the control device 60 controls the execution of the jobs in the cloud services #A to #C, but a plurality of control devices 60 may control the execution of the jobs.

<Client Device>

Figure 2:
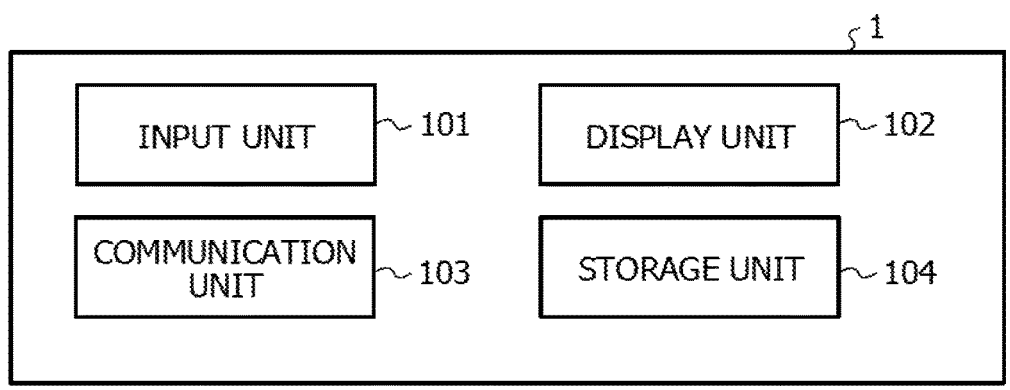
FIG. 2 is a functional block diagram illustrating a client device.

FIG. 2 is a functional block diagram illustrating the client device 1.

An input unit 101 accepts an operation input from the user. The input unit 101 may use, for example, hardware such as a keyboard and a mouse.

A display unit 102 is, for example, a liquid crystal display, and may display an execution result of a job and data stored in the DB of the above-described information processing system.

A communication unit 103 performs communication with another information processing device by a wire or wirelessly. The communication unit 103 is, for example, a communication device such as a network adapter or a network interface controller (NIC) provided in the client device 1.

A storage unit 104 is obtained, for example, by a storage medium such as a memory, a hard disk drive (HDD), or a solid state drive (SSD) provided in the client device 1. The storage unit 104 may stores various pieces of data that have been obtained from the DB and the like.

<Cloud Service>

FIG. 3 is a functional block diagram illustrating the cloud environment. In FIG. 3, the cloud environment 2 is illustrated, but a similar configuration may be employed in the cloud environments 3 and 4.

First, each of the processing execution servers 20-1 and 20-2 includes a processing execution unit 201, a storage unit 202, and a communication unit 203.

The processing execution unit 201 executes a job based on the control by the control device 60. The processing execution unit 201 is achieved, for example, when a processor provided in the server device that is the processing execution server executes a program. Here, a hardware circuit such as a central processing unit (CPU), a micro processing unit (MPU), or an application specific integrated circuit (ASIC) is collectively called the processor. The program may be stored in the storage unit 202 and read at the time of the processing execution, or may be received from another information processing device or another storage device.

The storage unit 202 may be, for example, a storage medium such as a memory, an HDD, or an SSD included in the server device that is the processing execution server, as hardware. The storage unit 202 may store various pieces of data obtained and generated when the processing execution server executes the job. In addition, as described above, the storage unit 202 may store a program desired for execution of the job.

The communication unit 203 performs transmission and reception of data to and from the DB server 21, the client device 1, or an information processing device included in another cloud service. The communication unit 203 is, for example, a communication device such as a network adapter or an NIC included in the server device that is the processing execution server.

The DB server 21 includes a control unit 211, a storage unit 212, and a communication unit 213.

The control unit 211 executes control of the DB obtained by a storage area of the storage unit 212. The control unit 211 is achieved, for example, when a processor included in the server device that is the DB server executes a program. The program is stored in a memory, a storage device, or the like, included in the server device that is the DB server, and may be read at the time of the processing execution, or may be received from another information processing device or another storage device.

The storage unit 212 includes the storage area by which the DB is obtained. The storage unit 212 is, for example, a storage medium such as a memory, an HDD, or an SSD included in the server device that is the DB server, as hardware. In addition, the storage unit 212 may store a program used to function the DB server 21 as a DB management system (DBMS).

The communication unit 213 performs transmission and reception of data to and from the processing execution servers 20-1 and 20-2, the client device 1, or an information processing device included in another cloud service. The communication unit 213 is, for example, a communication device such as a network adapter or an NIC included in the server device that is the DB server.

<Control Device>

Figure 4:
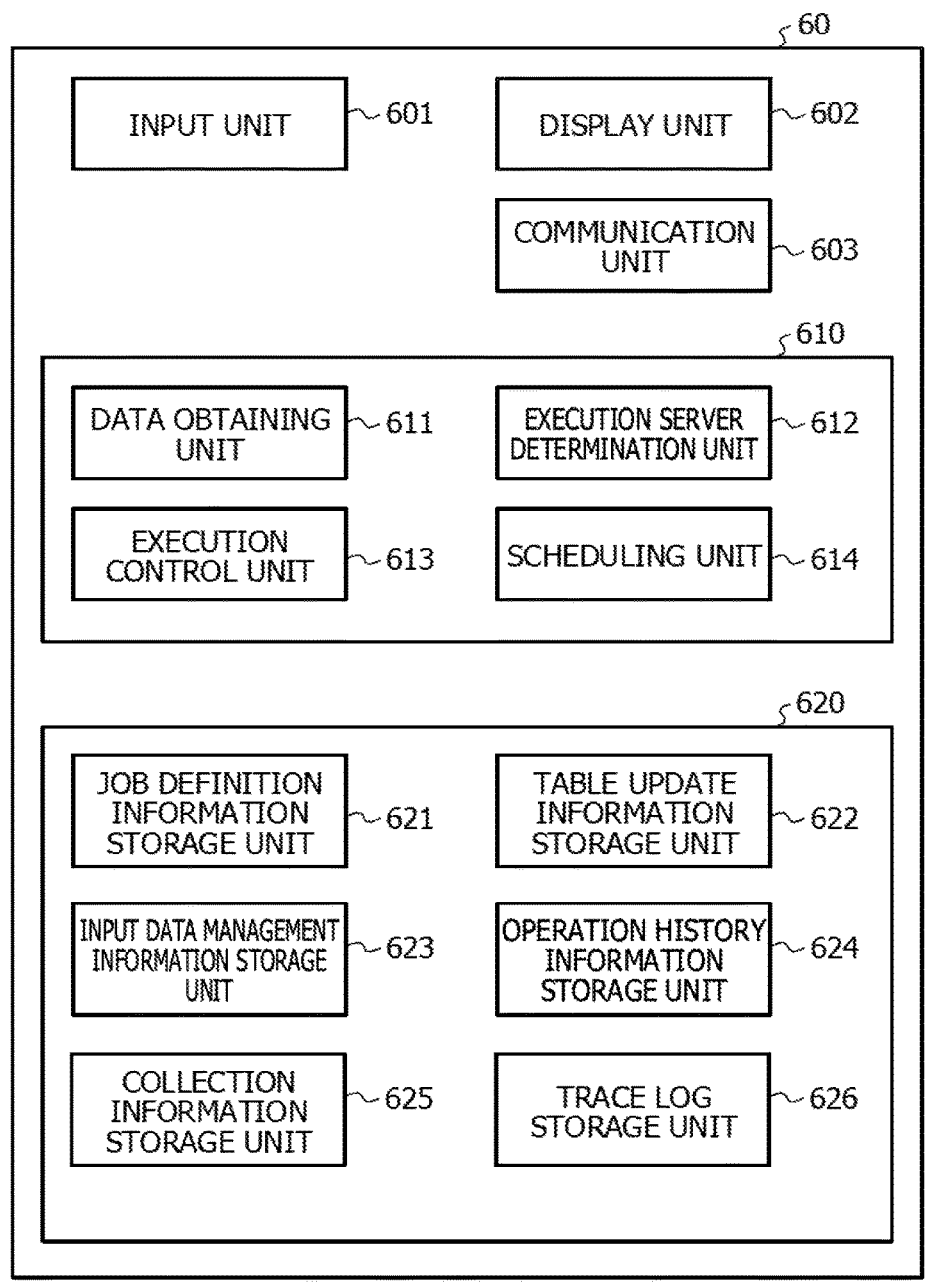
FIG. 4 is a functional block diagram illustrating a control device.

FIG. 4 is a functional block diagram illustrating the control device 60. The control device 60 includes an input unit 601, a display unit 602, and a communication unit 603. In addition, the control device 60 includes a control unit 610 and a storage unit 620.

The input unit 601 accepts an operation input from the user. The input unit 101 may use, for example, hardware such as a keyboard and a mouse.

The display unit 602 is, for example, a liquid crystal display, and may perform output of an execution result of the job and data stored in the DB of the above-described information processing system. The user performs a remote operation of the control device 60 for the input unit 601 and the display unit 602 using the client device 1, and the input unit 601 and the display unit 602 may be respectively substituted with the input unit 101 and the display unit 102.

The communication unit 603 performs communication with another information processing device by a wire or wirelessly. The communication unit 103 is, for example, a communication device such as a network adapter or an NIC included in the control device 60.

The control unit 610 includes a data obtaining unit 611, an execution server determination unit 612, an execution control unit 613, and a scheduling unit 614.

The data obtaining unit 611 obtains information used to determine a processing execution server that executes each job in the embodiment.

The execution server determination unit 612 determines a processing execution server that executes each of the jobs, based on the information that has been obtained by the data obtaining unit 611.

The execution control unit 613 controls execution of the job by the processing execution server. In addition, the scheduling unit 614 determines execution start timing of each of the jobs and the execution order of the jobs at the time of the execution of the plurality of jobs. The execution control unit 613 and the scheduling unit 614 correspond to a part of a function of software called a job management system.

The storage unit 620 is, for example, a storage medium such as a memory, an HDD, or an SSD included in the control device. The storage unit 620 stores information used for control of each of the jobs executed by the cloud services #A to #C. The storage unit 620 includes a job definition information storage unit 621, a table update information storage unit 622, an input data management information storage unit 623, an operation history information storage unit 624, a collection information storage unit 625, and a trace log storage unit 626. Each of the storage units included in the storage unit 620 is described later in detail. In addition, the storage unit 620 may store a program used to execute various pieces of processing in the embodiment, which is described later, by the control device 60.

For example, the control unit 610 is achieved when a processor included in the information processing device that is the control device 60 executes a program stored in the storage unit 620.

<Job Definition Information>

FIG. 5 is a diagram illustrating an example of data stored in the job definition information storage unit 621 according to the embodiment. The job definition information storage unit 621 stores definition information for each of the jobs executed by the cloud services #A to #C. For example, as illustrated in FIG. 5, the job definition information storage unit 621 stores a job name 6211, a start time 6212, job information 6213, execution server information 6214, and a target flag 6215.

The job name 6211 is information by which each of the plurality of jobs that are control targets is identified. In FIG. 5, as the job names, "Job-AA" to "Job-EE" are illustrated, but the data format of the job name 6211 is not limited to a specific example, and an example different from the FIG. 5 may be employed as long as each of the jobs is allowed to be uniquely identified.

The start time 6212 is information indicating a time at which the job starts (execution start). It is assumed that the start time of each of the jobs is set in advance, for example, by processing executed by the scheduling unit 614 of the control device 60. For example, in FIG. 5, it is indicated that the job the name of which is "Job-AA" is executed at a time "17:30:00". In addition, it is indicated that the job the name of which is "Job-BB" is executed at a time "19:00:00". In addition, it is indicated that the job the name of which is "Job-CC" is executed at a time "21:00:00". In addition, it is indicated that the job the name of which is "Job-DD" is executed at a time "22:30:00". In addition, it is indicated that the job the name of which is Job-EE is executed by a time "0:00:00". Thus, the job in the embodiment may also be referred to as execution of batch processing at a time that has been set to the start time 6212.

In FIG. 5, it is assumed that each of the jobs is executed by the schedule illustrated in the start time 6212 on a daily basis, but there exists a job in which the presence or absence of the execution or the schedule start time varies from day to day, from among the jobs. When a job exists in which the presence or absence of the execution or the schedule start time varies from day to day, for example, it may also be assumed that a date in which the job starts (day of the week, date, etc.) and the start time of the date are defined.

The job information 6213 is information by which an execution file that starts when one of the processing execution servers illustrated in FIG. 1 executes a job is identified. As the job information 6213, for example, a path of a storage destination of the execution file in the storage unit of the processing execution server or the control device 60 is stored. It may be assumed that the execution file of the job is transmitted from the control device 60 to the processing execution server that executes the job at the time of the execution of the job. In addition, when a processing execution server that executes the job is determined, it may be assumed that the execution file of the job is transmitted to the processing execution server that executes the job prior to the execution of the job, and is stored in the storage unit of the processing execution server that executes the job.

The execution server information 6214 is information indicating a processing execution server (cloud service) caused to execute the job. When a processing execution server is determined for the job by processing that is described later and in which the processing execution server is determined, information by which the determined processing execution server is identified is stored in the value of the execution server information 6214.

For example, in FIG. 5, it is indicated that the job the name of which is "Job-AA" is executed by a processing execution server called "host A1". In the embodiment, it is assumed that "host A1" illustrated in FIG. 5 is an identifier of the processing execution server 20-1 of FIG. 1. In addition, although not illustrated in FIG. 5, it is assumed that "host A2" is an identifier of the processing execution server 20-2.

Similarly, for example, it is assumed that "host B1" and "host B2" are the respective identifiers of the processing execution servers 30-1 and 30-2. In addition, for example, "host C1" and "host C2" are the respective identifiers of the processing execution servers 40-1 and 40-2. The above-described identification of the processing execution server is merely an example, and an example different from FIG. 5 may be employed as long as each of the processing execution server is allowed to be uniquely identified.

The target flag 6215 is information indicating whether a job is a target for which a processing execution server that executes the job is determined in the actual operation. The significance of the target flag 6215 is described later in detail, and as the job in the embodiment, there is a job for which a processing execution server is determined in the actual operation and a job for which a processing execution server is determined in the test operation executed prior to the actual operation. For the job, when the value of the target flag 6215 is OFF, it is indicated that a processing execution server that executes the job has been determined in the test operation. In addition, when the value of the target flag 6215 is ON, it is indicated that a processing execution server is desired to be determined in the actual operation.

The processing execution server illustrated in the execution server information 6214 of FIG. 5 is determined when the determination processing of a processing execution server in the embodiment is executed, but the determination processing of a processing execution server is described later in the embodiment.

<Table Update Information>

FIG. 6 is a diagram illustrating an example of information stored in the table update information storage unit 622. As illustrated in FIG. 6, the table update information storage unit 622 stores, for example, pieces of information such as a job name 6221, an estimated start time 6222, a data table ID (identifier) 6223, an access type 6224, and an update flag 6225.

The job name 6221 is information by which each of the plurality of jobs that are control targets is allowed to be identified. For example, a similar example of the job name 6211 illustrated in FIG. 5 may be applied to the job name 6221.

The start time 6222 is information that indicates a time at which the job starts (execution start), and that is equivalent to the start time 6212 illustrated in FIG. 5.

The data table ID 6223 is information by which a data table of a DB that is to be accessed is identified when each of the jobs is executed. There are two types of accesses to a data table, and one of the accesses corresponds to input of data to the job, and the other access corresponds to output of data from the job. Whether the access to the data table is input or output of data is indicated by information on the access type 6224. In FIG. 6, the value of the access type 6224 is "INPUT" when the access to a data table corresponds to input of the data and is "OUTPUT" when the access to data table corresponds to output of data.

The update flag 6225 is information indicating whether update occurs in data included in the data table when an access to the data table of the DB has occurred due to execution of the job. For example, the update of the data corresponds to an increase or decrease in record data included in the data table, update of the value of a data item, or the like, and causes a variation in the data size of the data table. When update of data included in the data table occurs due to an access to the data table (the data size of the data table may vary), the value of the update flag 6225 becomes "ON". In addition, when update of the data included in the data table does not occur due to an access to the data table (the data size of the data table does not vary), the value of the update flag 6225 becomes "OFF". The update flag 6225 is not information simply indicating whether update occurs in the data included in the data table, but may be information indicating whether update caused by a variation in the data amount occurs in data included in the data table. In addition, it may be assumed that whether the update is update with a variation in the data amount is determined by whether an absolute value of a difference between the data amount before the update the data amount after the update exceeds a predetermined threshold value.

In the description with reference to FIG. 6 as an example, for example, when the job the name of which is "Job-AA" is executed, an access occurs in the data table the ID of which is A-1 and the data table the ID of which is A-2. Hereinafter, for example, the job the name of which is "Job-AA" may be referred to as "job of Job-AA", and the data table the ID of which is "A-1" may be referred to as "data table A-1".

The data of the data table A-1 is input data to the job of "Job-AA" (data referred to by the job at the time of the execution of the job). In addition, data is output to the data table A-2 as a result of the execution of the job. Due to the output of the data, update of the data occurs in the data table A-2, so that the value of the update flag 6225 is "ON". In the data table A-1 including the input data, the value of the update flag 6225 is OFF, but this is why the job merely refers to the data and update of the data is not performed in the input data. Therefore, in FIG. 6, for the pieces of input data (pieces of data in each of which the value of the access type 6224 is INPUT), the values of the update flag 6225 are OFF uniformly. As described above, for the input data (data in which the access type 6224 is INPUT), update of the data is not performed, so that it may be assumed that the value of the update flag 6225 is omitted. In FIG. 6, in the job of "Job-DD", even for the data table A-2 in which the access type 6224 is OUTPUT, that is, output data, the update flag 6225 is "OFF". For example, this is why the job of "Job-DD" is a job in which data update is not performed or the data size of the data table does not vary even when the data update is performed.

<Input Data Management Information>

FIG. 7 is a diagram illustrating an example of data stored in the input data management information storage unit 623. The input data management information storage unit 623 stores information by which the data size of input data of each of the jobs that are control targets is identified. For example, as illustrated in FIG. 7, the input data management information storage unit 623 stores pieces of information such as a job name 6231, an input data table ID 6232, data size (per record) 6233, the number of records 6234, an input data amount 6235.

The job name 6231 is information by which each of the plurality of jobs that are control targets is allowed to be identified. For example, a similar example of the job name 6211 illustrated in FIG. 5 may be applied to the job name 6231.

The input data table ID 6232 is information by which a data table including input data for the job is identified. In FIG. 7, the input data table ID 6232 corresponding to each of the jobs is a data table ID in which the access type 6224 is INPUT, from among data table IDs included in the data table ID 6223 of FIG. 6.

The data size (per record) 6233 is information indicating the data size per record of the input data. In FIG. 7, a unit of the data size is set at kilobytes (KBs), but the data size may have another unit.

The number of records 6234 is information indicating the number of records extracted as the input data at the time of the execution of the job.

The input data amount 6235 is the data size of the input data for the job. In FIG. 7, a unit of the input data amount is set at megabytes (MBs), but the input data amount may have another unit.

<Evaluation of a Data Amount and Determination of a Processing Execution Server>

Figure 8:
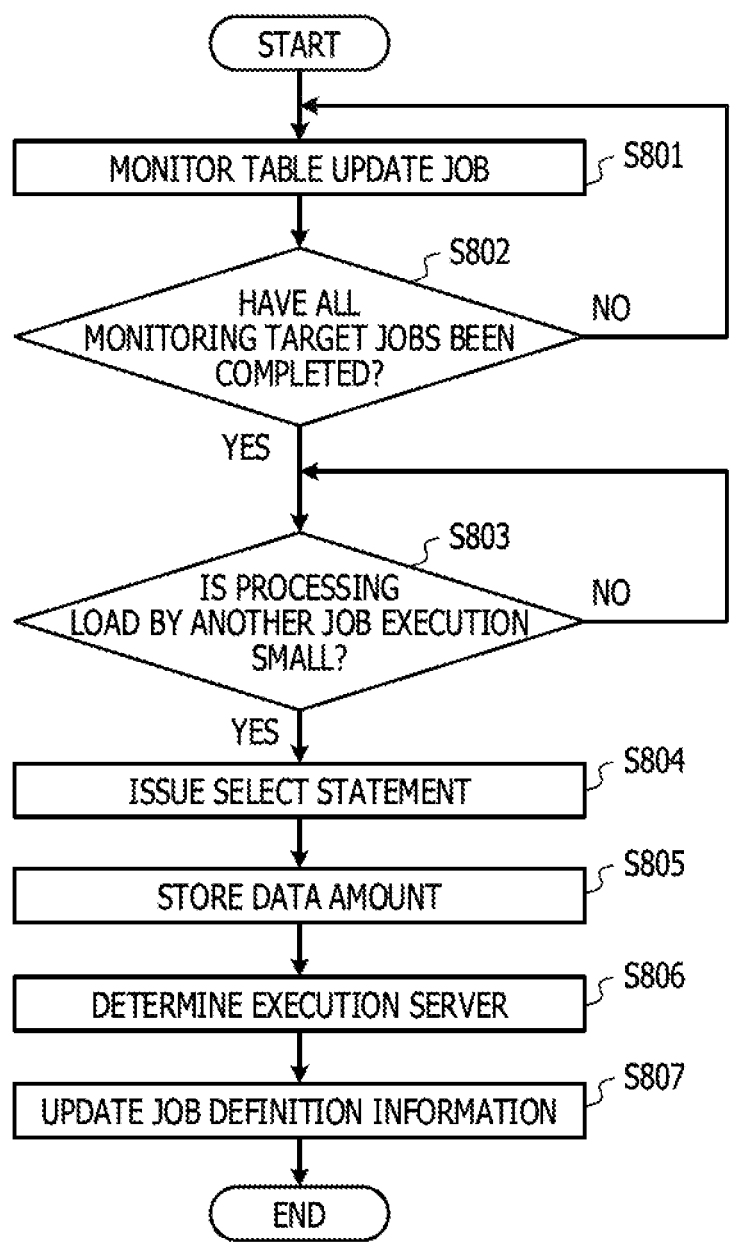
FIG. 8 is a flowchart illustrating data amount evaluation processing and determination processing of a processing execution server based on the evaluation result.

FIG. 8 is a flowchart illustrating data amount evaluation processing and of determination processing of a processing execution server based on an evaluation result in the embodiment. In the embodiment, it is assumed that the processing described with reference to FIG. 8 is executed in the actual operation of job execution management by the control device 60. In the embodiment, even in the test operation executed prior to the actual operation, the control device 60 executes processing in which a processing execution server is determined, but the processing executed in the test operation is described later.

In the following description, the data amount evaluation processing, and the determination processing of a processing execution server based on an evaluation result illustrated in the flowchart of FIG. 8 may be described using the lob of "Job-EE" illustrated in FIG. 5 or the like as an example.

First, in Step S801, the data obtaining unit 611 identifies a job that is executed prior to a job for which a processing execution server is determined and that executes update processing in which a data amount of input data for the job for which a processing execution server is determined may vary, for example, with reference to information stored in the table update information storage unit 622. In addition, the data obtaining unit 611 starts processing in which whether execution of the identified job has completed is monitored. Hereinafter, the above-described job that is executed prior to the job for which a processing execution server is determined and that executes update processing (data output) in which a data amount of the input data for the job for which a processing execution server is determined may vary is referred to as "monitoring target job".

A plurality of monitoring target jobs may exist for a single job for which a processing execution server is determined. For example, with reference to the information illustrated in FIG. 6, for the job of "Job-EE", the data table A-2 and the data table B-2 correspond to input data. The data table A-2 is an output destination of data at the time of the execution of the job of "Job-AA", and the value of the update flag 6225 in the output data is "ON". In addition, the data table B-2 is an output destination of data at the time of the execution of the job of "Job-BB", and the value of the update flag 6225 in the output data is "ON". Thus, the monitoring target jobs are the job of "Job-AA" and the job of "Job-BB". The data table A-2 is also an output destination of data at the time of the execution of the job of "Job-DD", but in FIG. 5, for data output to the data table A-2 at the time of the execution of the job of "Job-DD", the value of the update flag 6225 is "OFF". In the job of "Job-DD", update does not occur in data included in the data table (the data size of the data table does not vary) at the time of the data output, so that the job of "Job-DD" may not be set as a monitoring target job.

In Step S802, the data obtaining unit 611 monitors the operation status of the monitoring target job that has been identified in Step S801, and determines whether all of the jobs that have been identified as the monitoring target jobs have ended. For example, the data obtaining unit 611 may determine whether the monitoring target jobs have ended, with reference to the information stored in the operation history information storage unit 624. The determination processing of whether the monitoring target jobs have ended is described in detail later with a description of the information stored in the operation history information storage unit 624.

When the data obtaining unit 611 has determined that not all of the monitoring target jobs have ended (NO in Step S802), the data obtaining unit 611 continues to execute the monitoring processing for the monitoring target job that is yet to end. When the data obtaining unit 611 has determined that execution of some of the monitoring target jobs had ended, the data obtaining unit 611 may end the monitoring processing for the job the execution of which has been determined to end.

In addition, when all of the monitoring target jobs have ended (YES in Step S802), the processing of Step S803 is executed. When all of the monitoring target jobs have ended, a data amount of input data for a job for which a processing execution server is determined does not vary in the subsequent processing. Thus, after all of the monitoring target jobs have ended, the data obtaining unit 611 may obtain an evaluation result equivalent to that at the time of the execution of the job by performing data amount evaluation of the input data for the job for which a processing execution server is determined.

In Step S803, the data obtaining unit 611 monitors the processing load of a processing execution server caused to issue an inquiry statement when the data amount is evaluated. In addition, the data obtaining unit 611 determines whether the processing load of the processing execution server satisfies a set condition.

Here, the above-described inquiry statement is, for example, an inquiry statement of a SQL, which specifies a data table that stores data read as input data by the job for which the processing execution server is determined, that is, a SELECT statement.

It is assumed that the condition by which the processing load of the processing execution server is determined is that the processing load of the processing execution server is a reference value or less, which has been set in advance, as an example. For example, for each of the CPU usage rate of the processing execution server and the usage rate of the communication band, a threshold value is set, and the data obtaining unit 611 may perform the determination based on whether the usage rate is the threshold value or less. A specific threshold value may be changed as appropriate, and the data obtaining unit 611 may perform the determination not based on whether the usage rate is the threshold value or less, but based on whether the usage rate is less than the threshold value.

In the processing execution server, the processing load caused by the execution of the job or the like occurs. For example, as described above with reference to FIG. 6, the monitoring target jobs corresponding to the job of "Job-EE" are the job of "Job-AA" and the job of "Job-BB". In addition, when data amount evaluation of input data is performed after the execution of the job of "Job-M" and the job of "Job-BB" has completed, an evaluation result equivalent to that at the time of the execution of the job may be obtained. However, as illustrated in FIG. 6, between the estimated execution times of the job of "Job-AA" and the job of "Job-BB" and the estimated start time of the job of "Job-EE", execution of the job of "Job-CC" and the job of "Job-DD" is scheduled. When the job of "Job-CC" and the job of "Job-DD" are executed, a data table that stores data to be input data of the job of "Job-EE" is not updated (the data amount does not vary). However, when the job is executed, the processing load occurs in the processing execution server that has executed the job. Thus, for example, in the processing execution server that executes the job of "Job-CC" and the processing execution server that executes the job of "Job-DD", the processing load caused by the execution of the job occurs. The processing execution server that executes the job of "Job-CC" and the processing execution server that executes the job of "Job-DD" may be the same.

Returning to FIG. 8, in Step S803, when the data obtaining unit 611 has determined that the processing load satisfies the set condition (No in Step S803), the data obtaining unit 611 continues the processing of Step S803, and waits for transmission timing of an inquiry statement.

In addition, in Step S803, when the data obtaining unit 611 has determined that the processing load satisfies the set condition (YES in Step S803), the data obtaining unit 611 executes issuance processing of an inquiry statement used to perform data amount evaluation (Step S804). More specifically, the data obtaining unit 611 transmits an issuance request of an inquiry statement used to perform data amount evaluation, to a processing execution server that belongs to the same cloud service as a DB server from which the job for which a processing execution server is determined performs reading of input data. In addition, the processing execution server that has received the issuance request of the inquiry statement issues an inquiry statement to the DB server. When the data obtaining unit 611 has determined that the processing load satisfies the set condition even when predetermined timing arrives in addition to determination of the processing load of the processing execution server using the threshold value in Step S803, addition setting may be performed so that the processing of Step S804 is executed. The additional setting is setting used to avoid non-execution of the processing of Step S804 until the execution start of the job when the processing load of the processing execution server continues to exceed the threshold value. It may be assumed that the predetermined time may be determined, for example, by performing inverse operation on a processing time or the like taken to obtain (calculate) a data amount of the input data, from the execution start timing of the job.

FIG. 9 is a diagram illustrating an example of an inquiry statement. Both inquiry statements 901 and 902 of FIG. 9 are SELECT statements.

The inquiry statement 901 is an inquiry statement that specifies a record in which the value of data of a data string the name of which is "column_1" is "XXX" from a data table the name of which is "table_A-2". Here, it is assumed that "table_A-2" is the name of the data table A-2. That is, the inquiry statement 901 is an inquiry statement that specifies the data of the data table A-2. The inquiry statement 902 is an inquiry statement that specifies a record in which the value of data of a data string the name of which is "column 2" is "YYY" or more from a data table the name of which is "table_B-2". Here, it is assumed that "table_B-2" is the name of the data table B-2. That is, the inquiry statement 901 is an inquiry statement that specifies the data of the data table B-2.

An inquiry statement issued at the time of the data input of the job execution may be obtained, for example, from log information (trace log) on an inquiry statement of a SQL issued caused by the execution of the job. The trace log may be obtained, for example, by activating a log output function (also referred to as an SQL trace function or the like) included in a DBMS at the time of the execution of the job, and stored in the trace log storage unit 626. The data obtaining unit 611 may identify an inquiry statement that has been issued at the time of the data input for the job of "Job-EE" from a trace log of the inquiry statement and obtain a trace log and input data in the processing of Step S804 by issuing the identified inquiry statement in the processing of Step S804.

Returning to FIG. 8, the data obtaining unit 611 obtains the number of records of data that has been executed as a result of the issuance of a SELECT statement and stores the obtained number of records in the input data management information storage unit 623 (Step S805). The data obtaining unit 611 may obtain the number of records of the executed data, for example, with reference to the trace log. The trace log includes, for example, information indicating the number of records for which input/output has been performed in the DB at a result of the issuance of the inquiry statement.

Here, as illustrated in FIG. 7, for the input data of each of the jobs, as the data size (per record) 6233, the data size of a single record portion is stored in the input data management information storage unit 623. Thus, the data obtaining unit 611 may calculate a data amount of the input data by multiplying the data size of the single record portion by the number of records of the extracted data. The data obtaining unit 611 stores the calculated data amount in the input data management information storage unit 623.

As described above, an example of the set condition is that the processing load of the processing execution server is a reference value or less, which has been set in advance. When transmission of an inquiry statement is performed at timing at which the processing load of the processing execution server that is a destination of the inquiry statement is low, an impact on the processing of the processing execution server is reduced, and even when the processing of the data amount evaluation is executed, execution delay of another job that is being executed is reduced.

In Step S806, the execution server determination unit 612 determines a processing execution server that executes the job, based on the information stored in the input data management information storage unit 623. For example, the data obtaining unit 611 determines, as a server that processes the job, a processing execution server included in a cloud service in which there is the largest data amount of the input data from among cloud services in each of which a DB including a data table corresponding to the input data operates.

A description is made below using the job of "Job-EE" as an example. In FIG. 7, a data amount of the data table A-2 corresponding to input data is 80 MB, and a data amount of the data table B-2 corresponding to another piece of input data is 420 MB. That is, the data amount of the data table B-2 is larger than the data amount of the data table A-2. Thus, the execution server determination unit 612 determines that the job of "Job-EE" is executed by the processing execution server included in the cloud service #B, as a result of evaluation of the data amount of the input data.

The execution server determination unit 612 updates the execution server information 6214 stored in the job definition information storage unit 621 in accordance with the determination result in Step S806 (Step S807).

By the above-described processing, as illustrated in FIG. 5, the processing execution server is determined for the job of "Iob-EE". As a result of the processing Steps S806 and S807, the execution server information 6214 is updated so that the job of "Job-EE" is executed in the processing execution server included in the cloud service #B (the processing execution server of the host B1) in which there is the largest data amount of the input data. Thus, in view of data transfer between the cloud services, optimization of the processing execution server for the job may be achieved.

<Operation History Information>

FIG. 10 is a diagram illustrating an example of information stored in the operation history information storage unit 624. The information stored in the operation history information storage unit 624 is information corresponding to an execution log of the job. For example, as illustrated in FIG. 10, the operation history information storage unit 624 stores a job name 6241, a start time 6242, an end time 6243, and status information 6244.

The job name 6241 is information by which each of the plurality of jobs that are control targets is identified. For example, a similar example of the job name 6211 illustrated in FIG. 5 may be applied to the job name 6241.

The start time 6242 is information indicating a time at which each of the jobs executed in practice. In the actual system operation, the execution start of the job may be shifted from the defined start time and the estimated start time that has been identified in advance. Therefore, the start time 6242 may be different from the start time 6212 of FIG. 5 and the estimated start time 6222 of FIG. 6.

The end time 6243 is information indicating a time at which the job has completed.

The status information 6244 is information indicating the status in which the execution of the job has completed. For example, as illustrated in FIG. 10, when the value of the status information 6244 is "normal completion", it is indicated that the job has operated normally and ended. In addition to the example of FIG. 10, when the operation history information storage unit 624 stores, for example, information such as a return value when the job has been executed, the status when the execution of the job has completed may be identified. The return value of the job is data transmitted to an invoker (control device 60) as a result of the processing of the job when the processing has completed, and includes information indicating the status when the execution of the job has completed such as information indicating whether the execution of the job has completed normally. Therefore, it may be assumed that the operation history information storage unit 624 stores the return value of the job instead of the status information 6244, or the value of the status information 6244 may be obtained based on the return value. In addition, it may be assumed that the operation history information storage unit 624 stores both of the status information 6244 and the return value of the job.

The various pieces of information illustrated in FIG. 10 are stored, for example, in the operation history information storage unit 624 depending on an execution of the job in each of the processing execution servers illustrated in FIG. 1. For example, the time stored in the start time 6242 may be a time at which the control device 60 has transmitted an execution start request of the job to a processing execution server that executes the job. In addition, when the processing execution server that has received the execution start request of the job transmits a response by which the execution start of the job is notified, to the control device 60, the time stored in the start time 6242 may be a time at which the control device 60 has received the response or an execution start time of the job, which is included in the response.

For example, the time stored in the end time 6243 may be a time at which the control device 60 has received a response caused by the completion of the execution of the job from the processing execution server that executes the job. In addition, the time stored in the end time 6243 may be a time at which the response by which the completion of the execution of the job by the processing execution server is notified has been transmitted to the control device 60, or an execution end time of the job, which is included in the response.

<Description of Step S802>

In the processing of Step S802 illustrated in FIG. 8, the data obtaining unit 611 may monitor the execution status of each of the jobs, for example, with reference to the operation history information storage unit 624. For example, it may be assumed that the data obtaining unit 611 determines that the monitoring target job has completed when the data obtaining unit 611 has detected that the end time 6243 and the status information 6244 for the above-described monitoring target job are stored in the operation history information storage unit 624. In addition, as described above in the processing of Step S802, when the data obtaining unit 611 has detected the completion of the execution for all of the monitoring target jobs, the data obtaining unit 611 may start the processing of Step S803.

<Processing at the Time Test Operation>

As described above, in the embodiment, even when a data amount of input data for a job is evaluated, execution delay of the job due to the processing load for the evaluation may be reduced.

However, from among jobs, there may exist a job for which a processing execution server is allowed to be determined prior to the actual operation. Therefore, it is conceived that a processing execution server is determined in advance, for the job for which the processing execution server is allowed to be determined prior to the actual operation from among the jobs executed in the actual operation. For some jobs, when a processing execution server is determined prior to the actual operation, the number of jobs for each of which the evaluation of a data amount and determination of a processing execution server are desired may be reduced in the actual operation.

In addition, when the number of jobs for each of which the determination of a processing execution server is desired in the actual operation is reduced, the processing load of the evaluation of an input/output data amount of the job and the determination of a processing execution server in the actual operation may be further reduced. In the following embodiments, a series of processing is described in which a processing execution server is determined based on a result of the test operation executed prior to the actual operation.

<Data Collection in the Test Operation>

Figure 11:
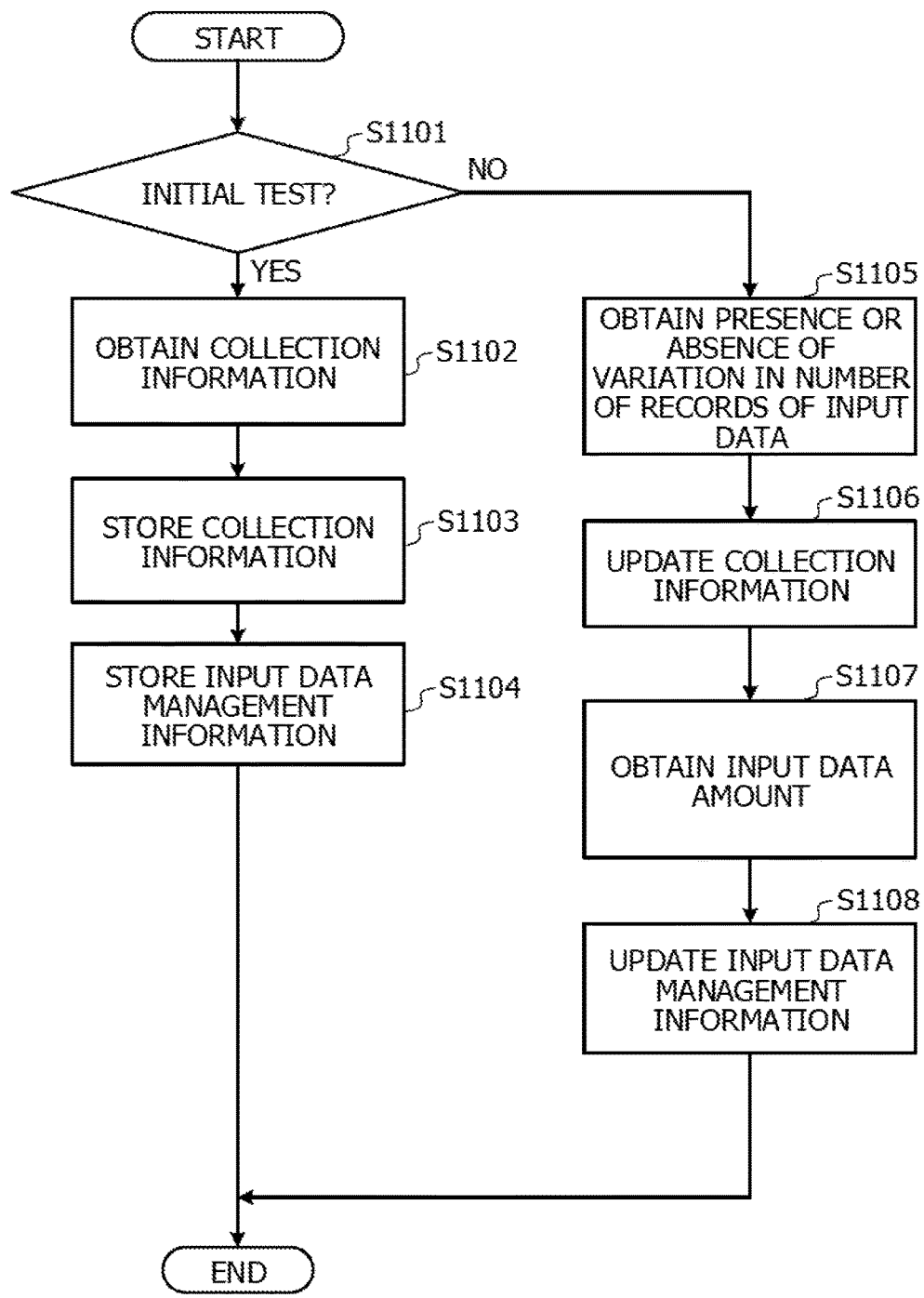
FIG. 11 is a flowchart illustrating processing in a test operation in the embodiment.

FIG. 11 is a flowchart illustrating processing in the test operation in the embodiment. In the embodiment, the test operation is performed prior to the actual operation, and information on each of a plurality of jobs is obtained.

When the test operation has been performed, first, in Step S1101, the data obtaining unit 611 determines whether the test operation is the initial execution. When the data obtaining unit 611 has determined that the test operation is the initial execution (YES in Step S1101), processing of Step S1102 is executed.

In Step S1102, the data obtaining unit 611 obtains collection information. In addition, the data obtaining unit 611 stores the collection information in the collection information storage unit 625 (Step S1103). The detail of the collection information is described below with reference to FIG. 12.

<Collection Information>

FIG. 12 is diagram illustrating an example of data stored in the collection information storage unit 625 according to the embodiment. For example, as illustrated in FIG. 12, the collection information storage unit 625 stores a job name 6251, a data table ID 6252, an access type 6253, a data amount variable flag 6254, and magnitude relation information 6255.

The job name 6251 is information by which each of the plurality of jobs that are control targets is identified. For example, a similar example of the job name 6211 illustrated in FIG. 5 may be applied to the job name 6251.

The data table ID 6252 is information by which a data table accessed when the job is executed is identified. For example, a similar example of the example of the data table ID 6223 illustrated in FIG. 6 may be applied to the data table ID 6252. Whether the access to the data table corresponds to input or output of data is indicated by information on the access type 6253. For example, a similar example of the access type 6224 illustrated in FIG. 6 may be applied to the access type 6253.

The data amount variable flag 6254 is information indicating whether the number of records of the input data varies when the job execution server executes the job a plurality of times using different pieces of master data. The detail of the data amount variable flag 6254 is described later.

The magnitude relation information 6255 is information indicating the larger data amount between input data and output data for each of the jobs. When pieces of input data are input from a plurality of cloud services, the data obtaining unit 611 compares an input data amount from a cloud service in which the input data amount is maximum with the data amount of the output data. In FIG. 6, when the value of the magnitude relation information is INPUT, it is indicated that the data amount of the input data is larger, and when the value of the magnitude relation information is OUTPUT, the data amount of the output data is larger.

An example of an obtaining method of the data illustrated in FIG. 12 is described below.

First, the data table ID 6252 and the access type 6253 may be obtained when the data obtaining unit 611 analyzes the above-described trace log.

The trace log includes a content of an issued inquiry statement. For example, a SELECT statement is an inquiry statement used to obtain data from a specified data table. When a SELECT statement that specifies a certain data table is issued, the data obtaining unit 611 determines that the specified data table is a data table in which input data of a job is stored. In addition, for example, an UPDATE statement, an INSERT statement, a DELETE statement are inquiry statements respectively used to execute update of data (value of data), addition of data, deletion of data for a data table. When a certain data table is specified in one of the UPDATE statement, the INSERT statement, and the DELETE statement, the data obtaining unit 611 determines the specified data table is a data table in which output data of the job is stored. In addition, the data obtaining unit 611 stores a data table ID of the data table that has been specified in the inquiry statement, as the data table ID 6252, and a determination result indicating whether the data is input data (INPUT) or output data (OUTPUT) as the access type 6253, in the collection information storage unit 625.

A magnitude relation of the input data and the output data may be identified, for example, when the data obtaining unit 611 obtains a monitoring result of a communication data amount of a network at the time of the data input/output and compares a data amount of the input data with a data amount of the output data indicated in the monitoring result. It may be assumed that the monitoring of the communication data amount is performed by the control device 60, or a monitoring result from another information processing device (not illustrated) including a monitoring function of the communication data amount is obtained by the control device 60.

When the data amount of the input data varies, the data amount of the output data also varies. However, even when the data amount has varied, a magnitude relation between the input data and the output data does not change unless the content of the processing defined for the job changes, so that the data obtaining unit 611 identifies the magnitude relation between the input data and the output data.

When the data amount of the input data is larger than the data amount of the output data, the data obtaining unit 611 stores INPUT as the value of the magnitude relation information 6255 corresponding to the job name 6251 of the job that is the monitoring target. When the data amount of the input data is smaller than the data amount of the output data, the data obtaining unit 611 stores OUTPUT as the value of the magnitude relation information 6255 corresponding to the job name 6251 of the job that is the monitoring target. For processing of Step S1105 descried later, the data obtaining unit 611 stores the data amount of the input data and the data amount of the output data indicated in the monitoring result, in the memory or the like.

By the processing of Steps S1102 and S1103, the collection information storage unit 625 stores the data table ID 6252, the access type 6253, and the magnitude relation information 6255 of the collection information illustrated in FIG. 12.

After the processing of Step S1103 has been executed, processing of Step S1104 is executed. In Step S1104, the data obtaining unit 611 stores the data table ID of the data table that has been specified by the inquiry statement in the input data management information storage unit 623 as the data table ID 6223. In addition, the data obtaining unit 611 stores a determination result indicating whether the data is input data (INPUT) or output data (OUTPUT) in the input data management information storage unit 623 as the access type 6224. By the processing of Step S1104, the input data management information storage unit 623 stores the data table ID 6223 and the access type 6224 illustrated in FIG. 6.

The processing of Step S1104 is executed, and the processing when the test operation corresponds to the initial execution ends.

Returning to the processing of Step S1101, the processing in the second test operation (or the second and the subsequent test operations) is described below. The second test operation is performed so that master data different from the initial test operation is applied to each of the DBs of the cloud services #A to #C for determination of the presence or absence of a variation in the number of records, which is described later. When the data obtaining unit 611 has determined that the test operation described later does not correspond to the initial execution (NO in Step S1101), the processing of Step S1105 is executed.

The data amount variable flag 6254 is described in detail before a description of Step S1105. When the data amount variable flag 6254 is information indicating whether the number of records, that is, a data amount of input data varies when the job execution server has executed the job a plurality of times using different pieces of master data, respectively.

Here, the different pieces of master data are, for example, data having a certain date in a DB and data having a different date (for example, the following day) in the same DB. In FIG. 6, when the number of records of the input data varies, the value of the data amount variable flag becomes ON. In addition, when the number of records of the input data does not vary, the value of the data amount variable flag is OFF.

Data in which the number of records of input data does not vary includes, for example, employee data in a human resource system. For example, this is why the number of employees in a company does not vary dramatically depending on a day (except a specific day). In addition, data in which the number of records of input data varies includes, for example, sales data per day, which is data in which a variation in the number of records depending on a day is expected.

The data obtaining unit 611 may determine the presence or absence of a variation in the number of records of the input data, for example, based on the above-described monitoring result of the communication data amount of the network at the time of the data input/output. The data obtaining unit 611 obtains a data amount of the input data from the monitoring result (monitoring result in the second test operation). In addition, the data obtaining unit 611 refers to the data amount of the input data, which has been stored in the initial test operation. In addition, the data obtaining unit 611 compares the input data amount in the initial test operation with the input data amount in the second test operation, and determines the presence or absence of a variation in the data amount. For the presence or absence of a variation in the number of records of the input data, for example, a predetermined threshold value is set for a fluctuating data amount, and the determination may be performed based on whether the variation in the data amount is the threshold value or more or exceeds the threshold value.

In Step S1106, the data obtaining unit 611 updates the information stored in the collection information storage unit 625. For example, the data obtaining unit 611 stores the determination result of the presence or absence of the variation in the number of records of the input data, in the collection information storage unit 625, as the data amount variable flag 6254. As described above, in addition to the information that has been obtained in the initial test operation, the various pieces of information illustrated in FIG. 12 are stored in the collection information storage unit 625 as the collection information.

In addition, in the above-described trace log, information indicating the number of records the input/output of which has been performed in the DB is included as a result of the issuance of the inquiry statement. The data obtaining unit 611 may obtain the number of records and the monitoring result of the communication data amount of the network at the time of the data input/output, and calculate the data size per record in the data input/output based on the data amount indicated in the monitoring result and the number of records included in the trace log.

The data obtaining unit 611 stores the obtained number of records of the input data in the input data management information storage unit 623 as the number of records 6234. In addition, the data obtaining unit 611 stores the calculated data size per record of the input data in the input data management information storage unit 623 as the data size (per record) 6233. In addition, the data obtaining unit 611 stores a value that has been obtained by multiplying the data size per record of the input data by the number of records, in the input data management information storage unit 623 as the input data amount 6235. Thus, the information as illustrated in FIG. 7 is stored in the input data management information storage unit 623.

<Determination Processing of a Processing Execution Server in the Test Operation>

Figure 13:
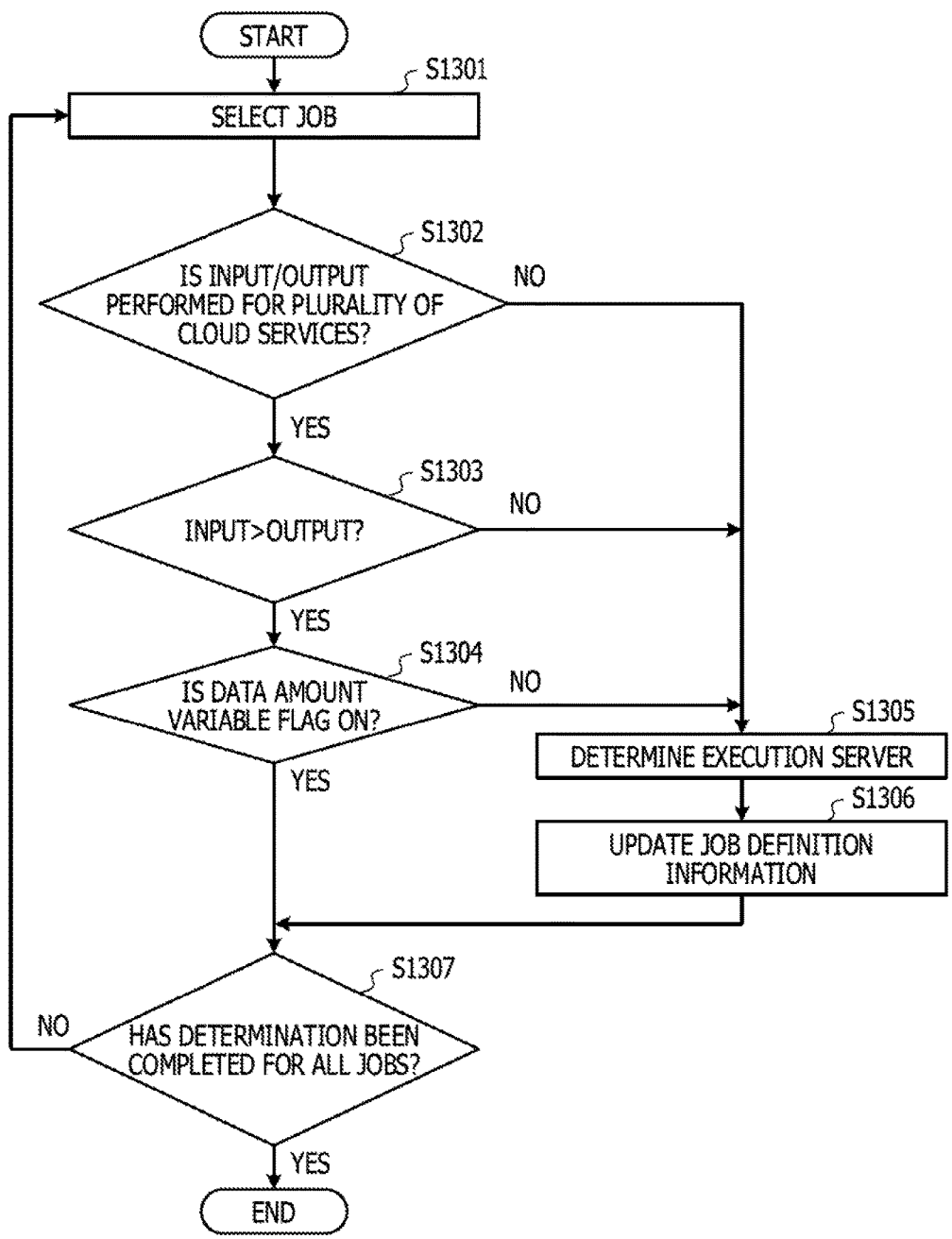
FIG. 13 is a flowchart illustrating processing in which a processing execution server is determined in the test operation.

FIG. 13 is a flowchart illustrating processing in which a processing execution server (cloud service) that executes each of the jobs is determined in the test operation.

First, in Step S1301, the execution server determination unit 612 selects one of the jobs. The selection order is not limited to a specific example, and the order may be selected so that, for all of the jobs that are control targets, a processing execution server that executes the job is determined eventually.

After that, the execution server determination unit 612 determines whether, for the job that has been selected in Step S1301, input/output of data is performed for the plurality of cloud services (Step S1302). In the following description, for convenience of explanation, the job that has been selected in Step S1301 is referred to as "selection job".

For example, the execution server determination unit 612 refers to the value of the data table ID 6223 that is stored in the table update information storage unit 622 and that has been associated with the job name of the selection job. At that time, there may exist a plurality of values of the data table ID 6223, which have been associated with the job name of the selection job.

When there is a plurality of values of the data table ID 6223, which are referred to, and there are data tables of a plurality of cloud services, the execution server determination unit 612 determines that the selection job is a job that performs input/output of data for the plurality of cloud services. For example, in the case of FIG. 6, data of a data table B-1 and data of a data table A-4 are input to the job of Job-CC, and data is output to a data table C-1 from the job of Job-CC. That is, the job of Job-CC is a job that performs input/output of data for the plurality of cloud services that are the cloud services #A, #B, and #C.

In addition, for example, in FIG. 6, data of the data table A-1 is input to the job of Job-AA, and data is output to the data table A-2 from the job of Job-AA. That is, it is understood that input/output of data in the job of "Job-AA" is performed merely for the cloud service #A. Thus, the job of "Job-AA" is not a job that executes the input/output of data for the plurality of cloud services.

When the execution server determination unit 612 has determined that the selection job is not the job that performs input/output of data for the plurality of cloud services (NO in Step S1302), processing of Step S1305 is executed. In addition, when the execution server determination unit 612 has determined that the selection job is the job that performs input/output of data for the plurality of cloud services (YES in Step S1302), processing of Step S1303 is executed.

In Step S1303, the execution server determination unit 612 determines whether a data amount of the input data is larger than a data amount of the output data, for the selection job. For example, the execution server determination unit 612 may determine whether the data amount of the input data is larger than the data amount of the output data, based on the value of the magnitude relation information 6255 that is stored in the collection information storage unit 625 and that has been associated with the job name of the selection job.

When the execution server determination unit 612 has determined that the data amount of the input data is smaller than the data amount of the output data (NO in Step S1303), the processing of Step S1305 is executed. In addition, when the execution server determination unit 612 has determined that the data amount of the input data is larger than the data amount of the output data (YES in Step S1303), processing of Step S1304 is executed.

In Step S1304, the execution server determination unit 612 determines whether the number of records of the input data of the selection job varies. The execution server determination unit 612 may determine whether the number of records of the input data of the selection job varies, for example, based on whether the data amount variable flag 6254 that is stored in the collection information storage unit 625 and that has been associated with the job name of the selection job is ON. For example, in FIG. 12, in the job of "Job-DD", both data amount variable flags of a data table B-3 and a data table C-2 corresponding to input data are OFF. In addition, for example, in the job of "job-EE", both data amount variable flags of a data table A-2 and a data table B-2 corresponding to input data are ON.

When the data amount variable flag of the selection job is ON (YES in Step S1304), the execution server determination unit 612 sets, as ON, the target flag 6215 for the selection job, which is stored in the job definition information storage unit 621, and executes processing of Step S1307. The target flag 6215 is set as ON in a case in which the record variable flag of the selection job is ON in Step S1304 because input data the data amount of which becomes maximum may be changed in the actual operation in the selection job. When the target flag 6215 is set as ON, the execution server determination unit 612 performs setting so that the processing execution server of the selection job is determined in the actual operation.

In addition, when the data amount variable flag of the selection job is OFF (NO in Step S1304), the processing of Step S1305 is executed.

In Step S1305, the execution server determination unit 612 determines a processing execution server that executes the selection job (cloud service). The execution server determination unit 612 sets, as OFF, the target flag 6215 for the selection job, which is stored in the job definition information storage unit 621 after having determined the processing execution server. The target flag 6215 is set as OFF because the processing execution server of the selection job may be determined in the test operation. The processing execution server is determined in accordance with the following rules. A rule 1 is that a processing execution server of a cloud service in which the selection job performs input/output of data when the selection job is not a job that performs input/output of data for the plurality of cloud services (when there is a single cloud service in which input/output is performed). A rule 2 is that a processing execution server of a cloud service the data amount of which is larger (input side or output side) executes the selection job when there is a single cloud service in which data is input to the selection job and that is different from a cloud service in which output of data is performed. A rule 3 is that a processing execution server of a cloud service in which data is output from the selection job executes the selection job when there is a plurality of cloud services in each of which data is input to the selection job, and processing in the selection job is merge processing of data. A rule 4 is that a processing execution server of a cloud service the input data amount of which is the largest when the data amount variable flag is OFF in a case in which there is a plurality of cloud services in each of which data is input to the selection job, and processing in the selection job is counting processing of data. A rule 5 is that a processing execution server is dynamically determined each time the selection job is executed in the actual operation when the data amount variable flag is ON in the above-described rule 4.

The setting rationale in each of the rules is described below. First, in the rule 1, in a case in which input/output of data is completed in a single cloud service, when a job is executed in a processing execution server of the cloud service in which the input/output of data occurs, a reduction in a data transfer time may be performed.

For example, with reference to FIG. 12, input/output of data in the job of Job-AA is executed merely in the cloud service #A. Thus, for example, when the selection job is the job of "Job-AA", the job of "Job-AA" is determined so as to be executed in the processing execution server of the cloud service #A.

In the rule 2, a data amount of input data is compared with a data amount of output data, and a processing execution server of a cloud service in which the data amount is larger is caused to execute a job. A reduction in a data transfer time of the larger data amount from among the input data and the output data may be achieved.

For example, with reference to FIG. 12, input data to the job of Job-BB corresponds to a data table A-3 included in the DB of the cloud service #A. In addition, an output destination of output data of the job of "Job-BB" corresponds to the data table B-2 included in the DB of the cloud service #B. In addition, in the job name Job-BB, the value of the magnitude relation information 6255 is OUTPUT, and the data amount of the output data is larger than the data amount of the input data. Thus, for example, when the selection job is the job of "Job-BB", the job of "Job-BB" is determined so as to be executed in the processing execution server of the cloud service #B.

The rule 3 is a rule when processing in the selection job is the merge processing of data. When there is a plurality of cloud services in each of which data is input to the selection job, processing executed in the selection job is one of the merge processing of data and counting processing of data. The merge processing of data is processing in which records that have been respectively read from the plurality of DBs are combined to generate a new record (counting processing is described later with reference to the rule 4). In the merge processing, when the data amount of each of the pieces of input data is compared with the data amount of the generated new record, that is, the output data, the data amount of the output data becomes larger than that of each of pieces of the input data due to an increase in a data string of the record. Even when the data amount of the input data varies, a magnitude relation between the input data and the output data does not change. In this case, when the job is executed in a processing execution server of a cloud service that is an output destination of the output data, a reduction in a transfer time of data transfer having the largest data amount is achieved.

For example, with reference to FIG. 12, data of the data table B-1 and data of the data table A-4 are input to the job of "Job-CC", and data is output to the data table C-1 from the job of "Job-CC". In addition, for the job name Job-CC, the value of the magnitude relation information 6255 is OUTPUT, and the data amount of the output data becomes larger than the data amount of the input data. Here, the execution server determination unit 612 may determine that the job of "Job-CC" is a job that executes the merge processing because the value of the magnitude relation information 6255 is OUTPUT. Thus, for example, when the selection job is the job of "Job-CC", the job of Job-CC is determined so as to be executed in the processing execution server of the cloud service #C, based on the rule 3.

The rule 4 is a rule when the processing in the selection job is the above-described counting processing of data. The counting processing is, for example, processing in which pieces of order data for each day or each month are counted, and data of the counting result is generated. In the counting processing, when the data amount of each of the pieces of input data is compared with the data amount of the generated new record, that is, the output data, the data amount of the output data becomes smaller than that of each of the pieces of input data dues to a reduction in the number of records by the data counting. Even when the data amount of the input data varies, the magnitude relation between the input data and the output data does not change. In this case, when the job is executed in a processing execution server of a cloud service that is an input source of input data having the largest data amount from among the pieces of input data, a reduction in a transfer time of data transfer having the largest data amount is achieved. In the case of the rule 4, the data amount of the input data does not vary, so that a cloud service that is an input source of input data having the largest amount may be identified prior to the actual operation.

For example, with reference to FIG. 12, data of the data table B-3 and data of the data table C-2 are input to the job of "Job-DD", and data is output to the data table A-2 from the job of "Job-DD". For the job name Job-DD, the value of the magnitude relation information 6255 is INPUT, and the data amount of the input data becomes larger than the data amount of the output data. Here, the execution server determination unit 612 may determine that the job of "Job-CC" is a job that executes the counting processing because the value of the magnitude relation information 6255 is INPUT. In addition, with reference to the information stored in the input data management information storage unit 623 illustrated in FIG. 7, the values of the data amount variable flags 6254 in both of the data of the data table B-3 and the data of the data table C-2 are OFF, and in each of the pieces of data, the data amount does not vary. The data amount of the data table B-3 is 120 MB, and the data amount of the data table C-2 is 250. That is, the data amount of the data table C-2 is larger than that of the data table B-3. Thus, for example, when the selection job is the job of "Job-DD", the job of Job-DD is determined so as to be executed in the processing execution server of the cloud service #C, based on the rule 4.

In the case of the rule 5, a processing execution server is determined by the processing in the actual operation described above with reference to FIG. 8.

For example, with reference to FIG. 12, data of the data table A-2 and data of the data table B-2 are input to the job of "Job-EE", and data is output to the data table C-3 from the job of "Job-EE". For the job name Job-EE, the value of the magnitude relation information 6255 is INPUT, and the data amount of the input data becomes larger than the data amount of the output data. In addition, with reference to the information stored in the input data management information storage unit 623 illustrated in FIG. 7, the values of the data amount variable flags 6254 in both of the data of the data table A-2 and the data of the data table B-2 are ON, and in each of pieces of data, the data amount varies. Thus, for the job of Job-EE, a cloud service having the largest input data amount may be changed, so that, as described above, the processing execution server that executes the job of "Job-EE" is determined by the processing in the actual operation illustrated in FIG. 8.

As described above, for a job that falls under one of the rules 1 to 4, the execution server determination unit 612 may determine a processing execution server prior to the actual operation.

Returning to the description of FIG. 13, after the processing execution server that executes the selection job has been determined in the processing of Step S1305, the execution server determination unit 612 stores the information indicating the processing execution server that has been determined for the selection job, in the job definition information storage unit 621 (Step S1306). After the processing of Step S1306 has been executed, the processing of Step S1307 is executed.

In Step S1307, the execution server determination unit 612 determines whether a processing execution server has been determined for all of the jobs. That is, the execution server determination unit 612 determines whether there is an unselected job in Step S1301. When the execution server determination unit 612 has determined that there is an unselected job (NO in Step S1307), in the execution server determination unit 612, the flow proceeds to Step S1301, and the execution server determination unit 612 selects one of the unselected jobs, and repeats the processing in Step S1302 and the subsequent steps, for the selected job. When the execution server determination unit 612 has determined that there is no unselected job (YES in Step S1307), the execution server determination unit 612 ends a series of processing illustrated in FIG. 13.

By the above-described processing, for some of the jobs executed in the actual operation, a processing execution server that executes each of the jobs may be determined prior to the actual operation. Thus, in the actual operation, merely for a job for which a processing execution server has not been determined based on the result of the test operation, that is, a job falling under the above-described rule 5, the execution server determination unit 612 may determine a processing execution server in the actual operation. As a result, the processing load desired for evaluation of input/output data and determination of a processing execution server may be reduced in the actual operation.

For example, in the embodiment (in the state of FIG. 12), for "Job-AA", "Job-BB", "Job-CC", and "Job-DD", as illustrated in the execution server information 6214 of FIG. 10, a processing execution server that executes the job may be determined prior to the actual operation. In addition, in the actual operation, for the job of Job-EE, the processing in which a processing execution server is determined may be executed. Thus, the number of jobs for each of which a processing execution server is desired to be determined in the actual operation is reduced, and the processing load of the evaluation of an input/output data amount of the job and determination of a processing execution server may be reduced in the actual operation.

<Actual Operation>

The processing in the actual operation is described below again based on the above description.

Figure 14:
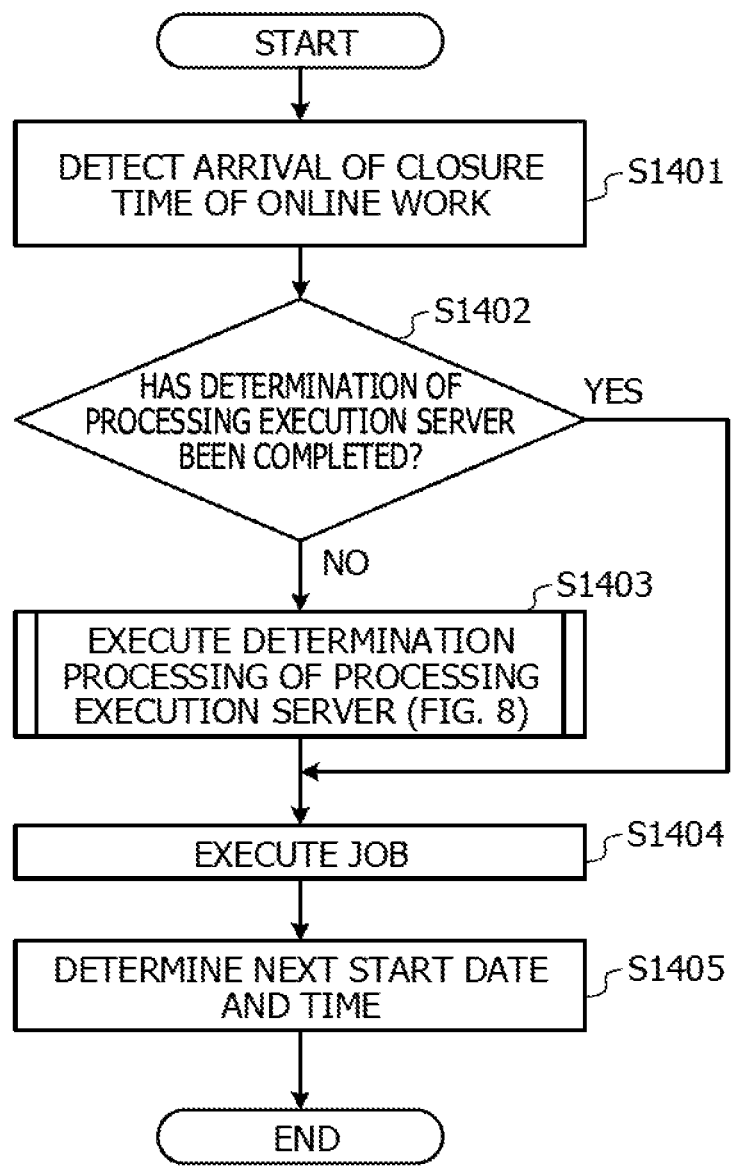
FIG. 14 is a flowchart illustrating processing in an actual operation.

FIG. 14 is a flowchart illustrating the processing executed by the control device 60 in the actual operation. A series of processing illustrated in FIG. 14 is executed for each of the jobs that are control targets.

The control device 60 detects arrival of the closure time of an online work in the information processing system that operates in each of the cloud services #A to #C (Step S1401). That is, the actual operation starts after the closure time of the online work in the information processing system that operates in each of the cloud services #A to #C has arrived. It is assumed that the online work is executed in each of the cloud services #A to #C.

Here, the description of the online work and the closure time at the embodiment is made, in the online work, real-time processing is executed in which pieces of data stored in the DB are updated sequentially depending on processing. By the real-time processing, update occurs in data stored in the DB, that is, data that is to become input data for each of the jobs. However, a closure time is set to the online work, and after the closure time, data stored in the DB referred to in the processing of each of the jobs is not updated. In a case in which a daily online work is used as an example, when an acceptable time of the real-time processing is from 8 am to 5 pm, the closure time is 5 pm, and update of data stored in the DB by the real-time processing is not performed until 8 am on the next day after the closure time. Alternatively, requests of processing are continuously accepted, but processing according to a request that has been accepted after 5 pm that is the closure time may be executed after 8 am on the next day. In the following description of the embodiment, it is assumed that the closure time of the online work is set at 5 pm, and as illustrated in FIG. 5, the processing is executed after 5 pm in each of the jobs. Thus, when each of the jobs is executed by the processing execution server after the closure time, an influence from update of data by the real-time processing may be excluded.

After the closure time of the online work has arrived, the control device 60 determines whether a processing execution server has been determined in the test operation, for each of the job the definition information of which is stored in the definition information storage unit 621 (Step S1401). For example, the control device 60 may determine whether a processing execution server has been determined, with reference to the value of the target flag 6215 that is stored in the job definition information storage unit 621 and that corresponds to the job name 6211 of each of the jobs. When the value of the target flag 6215 corresponding to the job name 6211 of each of the jobs is OFF, it is indicated that the processing execution server has been determined (a determination result in the test operation is applied), and when the value of the target flag 6215 is ON, it is indicated that the processing execution server is yet to be determined.

When the control device 60 has determined that a processing execution server had been determined in the test operation in Step S1402, the control device 60 executes processing of Step S1404. In addition, when the control device 60 has determined that a processing execution server is yet to be determined in the test operation in Step S1402, the control device 60 executes processing of Step S1403.

In Step S1403, for a job for which a processing execution server is yet to be determined, the control device 60 determines a processing execution server that executes the job. The processing of Step S1403 is the determination processing of a processing execution server, which is described above with reference to FIG. 8. After the processing of Step S1403 has been executed, the control device 60 executes the processing of Step S1404.

In Step S1404, the control device 60 executes the job based on the information stored in the job definition information storage unit 621. Here, the job definition information storage unit 621 stores identification information on the processing execution server that has been determined in the test operation or by the processing of Step S1403. Thus, the control device 60 transmits a job execution request to the processing execution server indicated in the execution server information 6214 stored in the job definition information storage unit 621, which has been associated with the job name 6211 of the job that is to be executed. In addition, the processing execution server that has received the request executes the job.

After the execution of the job has completed, the control device 60 determines the next start date and time, for the executed job (Step S1405). In FIG. 5, it is assumed that each of the jobs is executed by the schedule indicated in the estimated start time 6222 on a daily basis, but the processing of Step S1405 is considered for the existence of a job in which the presence or absence of the execution and a scheduled start time vary depending on a day.

After Step S1405 has been executed, the control device 60 ends a series of processing illustrated in FIG. 14, and the series of processing illustrated in FIG. 14 is executed when the closure time of the online work has arrived again (for example, the following day).

<Hardware Configuration>

Figure 15:
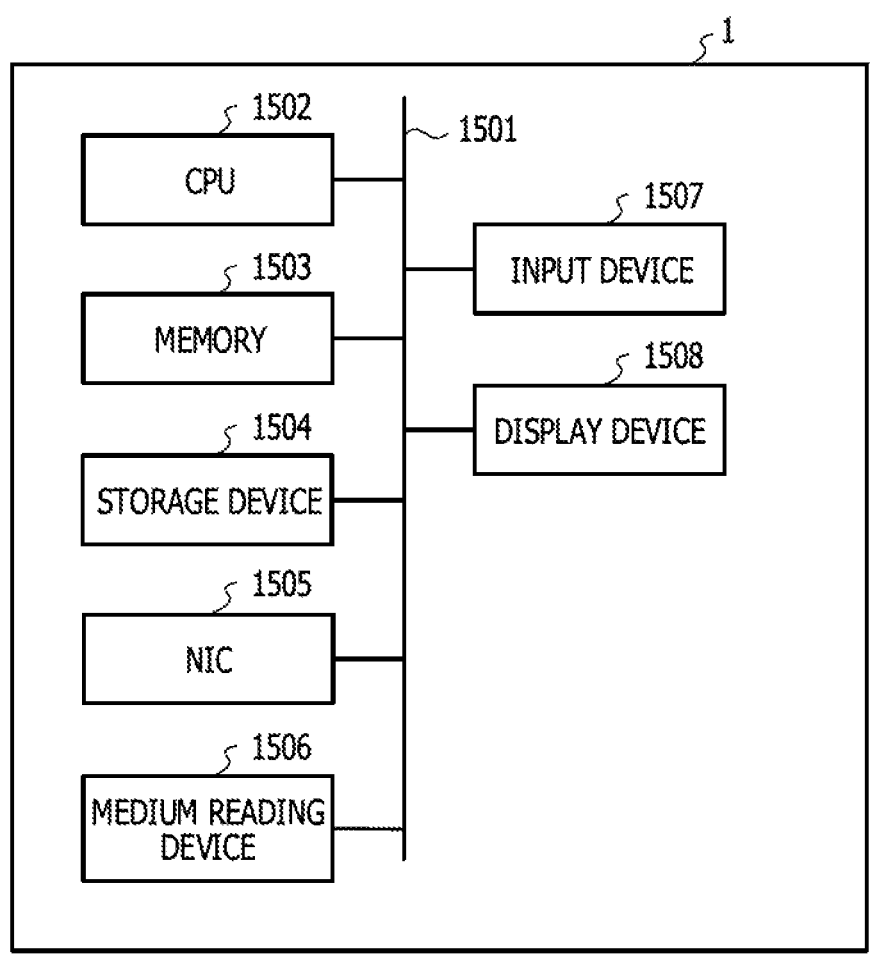
FIG. 15 is a diagram illustrating an example of a hardware configuration in the embodiment.

FIG. 15 is a diagram illustrating an example of a hardware configuration the client device 1 according to the embodiment. In FIG. 15, the example of the hardware configuration of the client device 1 is illustrated, but as described later, a similar configuration may be employed even in the processing execution server, the DB server, and the control device 60.

The client device 1 is, for example, an information processing device that includes a CPU 1502, a memory 1503, a storage device 1504, a NIC 1505, a medium reading device 1506, an input device 1507, and a display device 1508 that are coupled to each other through a bus 1501.

The CPU 1502 performs various pieces of operation control in the client device 1. The memory 1503 and the storage device 1504 store programs used to execute various pieces of processing described above in the embodiment and various pieces of data used for the various pieces of processing. The storage device 1504 is, for example, a storage medium such as an HDD or an SSD.

When the CPU 1502 reads the programs stored in the memory 1503 or the storage device 1504, and executes processing and control of the programs, the control device illustrated in FIG. 4 and each of the function units included in the control device may be achieved. In addition, each of the memory 1503 and the storage device 1504 may function as the storage unit 104 illustrated in FIG. 2.

The NIC 1505 is hardware used for transmission and reception of data through a wired or wireless network. The NIC 1505 may function as a communication unit 103 under the control of the CPU 1502.

The medium reading device 1506 is a device used to read data from a recording medium, and is, for example, a disk drive that reads data stored in a disk medium such as a compact disc-read-only memory (CD-ROM) or a digital versatile disc-read only memory (DVD-ROM), a card slot that reads data stored in a memory card, or the like. Some or all of pieces of data stored in the above-described storage unit 104 may be stored in a recording medium on which reading is allowed to be performed using the medium reading device 1506.

The input device 1507 is a device that accepts an input or a specification from the user of the client device 1. As an example of the input device 1507, for example, there are a keyboard, a mouse, and a touch pad. The display device 1508 performs display of various pieces of information under the control of the CPU 1502. The display device 1508 is, for example, a liquid crystal display. It may be assumed that a touch panel including a function of the input device 1507 and a function of the display device 1508 is used when the client device 1 is, for example, a smartphone, a PDA, or a tablet PC.

A computer of a hardware configuration similar to that of FIG. 15 may be used as the processing execution server, the DB server, and the control device 60 according to the embodiment, so that the description is omitted herein. However, specific hardware (the model, the performance, and the like) of the CPU, the memory, the storage device, the NIC, the medium reading device, the input device, and the output device may be different between the client device 1, the processing execution server, the DB server, the control device 60. For example, in the processing execution server, a CPU the calculation ability of which is higher than that of the client device 1 and a larger capacity memory may be provided. In addition, it may be assumed that, in order to secure a storage area, a storage device the capacity of which is larger than those of the client device 1 and the processing execution server may be provided in the DB server, or the DB server is coupled to a storage system allowed to store data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by a control device, the control method comprising:
identifying a specified time period based on execution history information on previous jobs related to a plurality of systems, the specified time period being a period prior to execution start timing of a first job, update processing for a data storage area from which the first job refers to data is not executed during the specified time period;
performing control so that evaluation timing of an amount of the data that the first job refers to from the data storage area is included in the identified time period;
determining a specified system among from the plurality of systems based on the amount of the data evaluated at the evaluation timing;
causing the specified system to execute the first job;
monitoring a processing load related to a system, from among the plurality of systems, that executes the one or more jobs different from the first job; and
determining a timing, as the evaluation timing, at which the processing load is equal to or less than a predetermined reference, the determined timing being included in the identified time period.

2. The control method according to claim 1, wherein the control method comprises:
identifying one or more jobs which execute the update processing for the data storage area from which the first job refers to the data based on the execution history, the one or more jobs being different from the first job; and
identifying, when completion of all of the one or more jobs is detected as a result of monitoring of operations of the identified one or more jobs, a time period from the detection to the execution start timing of the first job as the specified time period.

3. The control method according to claim 1, wherein each of the plurality of systems includes a storage unit; and wherein
the control method comprises:
obtaining an amount of pieces of data that the first job refers to from storage units of at least two or more systems among from the plurality of systems when the first job is a job that refers to the pieces of data stored in the storage units of the at least two or more systems; and
selecting a system having a largest amount of the pieces of data that the first job refers to from among the two or more systems, as the specified system to execute the first job.

4. The control method according to claim 3, wherein the control method comprises:
selecting data in which the data amount varies by update processing executed prior to the execution start timing of the first job from among the pieces of data referred to by the first job from the storage units of the two or more systems; and
performing evaluation of a data amount of the selected data as the evaluation of the data amount.

5. The control method according to claim 1, wherein the first job is a job that executes processing by referring to the pieces of data from the storage units of the at least two or more systems from among the plurality of systems and that executes counting processing for the pieces of referred data.

6. The control method according to claim 2, wherein a test operation in which the first job and a plurality of jobs including the one or more jobs are executed using the plurality of systems; and wherein
the control method comprises:
identifying a job, from the plurality of jobs, that executes processing by referring to data from the storage units of the at least two or more systems and that executes integration processing in which the referred pieces of data are combined; and
performing control so that the identified job that executes the integration processing is executed in a system including a storage unit where result data of the integration processing is to be stored in an actual operation executed after the test operation.

7. The control method according to claim 5, wherein the identification of the specified time period, the evaluation of the data amount, and the selection of the system to execute the first job are performed in the actual operation.

8. The control method according to claim 1, wherein each of the plurality of systems is in a different cloud environment; and wherein each of the plurality of jobs executes batch processing according to execution start timing set for each of the plurality of jobs.

9. A non-transitory computer-readable storage medium storing a control program that causes a control device to execute a process, the process comprising:
identifying a specified time period based on execution history information on previous jobs related to a plurality of systems, the specified time period being a period prior to execution start timing of a first job, update processing for a data storage area from which the first job refers to data is not executed during the specified time period;
performing control so that evaluation timing of an amount of the data that the first job refers to from the data storage area is included in the identified time period;
determining a specified system among from the plurality of systems based on the amount of the data evaluated at the evaluation timing;
causing the specified system to execute the first job;
monitoring a processing load related to a system, from among the plurality of systems, that executes the one or more jobs different from the first job; and
determining a timing, as the evaluation timing, at which the processing load is equal to or less than a predetermined reference, the determined timing being included in the identified time period.

10. A control device comprising:
a memory; and
a processor coupled to the memory and the processor configured to:
identify a specified time period based on execution history information on previous jobs related to a plurality of systems, the specified time period being a period prior to execution start timing of a first job, update processing for a data storage area from which the first job refers to data is not executed during the specified time period;
perform control so that evaluation timing of an amount of the data that the first job refers to from the data storage area is included in the identified time period;
determine a specified system among from the plurality of systems based on the amount of the data evaluated at the evaluation timing;
cause the specified system to execute the first job;
monitor a processing load related to a system, from among the plurality of systems, that executes the one or more jobs different from the first job; and
determine a timing, as the evaluation timing, at which the processing load is equal to or less than a predetermined reference, the determined timing being included in the identified time period.

* * * * *